United States Patent [19]
Bruls et al.

[11] Patent Number: 5,756,576
[45] Date of Patent: May 26, 1998

[54] RUBBER-MODIFIED POLYMER COMPOSITION

[75] Inventors: Wilhelmus G. M. Bruls, Meerssen; Robbie A. M. Buntinx, Heerlen; Valerie M. C. Reid, Maastricht, all of Netherlands

[73] Assignee: DSM N.V., Heerlen, Netherlands

[21] Appl. No.: 775,025

[22] Filed: Dec. 27, 1996

[30] Foreign Application Priority Data

Dec. 29, 1995 [BE] Belgium .................. 09501088

[51] Int. Cl.$^6$ .................... C08L 77/00; C08L 67/00; C08L 69/00; C08L 71/12
[52] U.S. Cl. .................... 525/66; 525/64; 525/67; 525/68; 525/70
[58] Field of Search .................... 525/66, 64, 67, 525/68, 70

[56] References Cited

U.S. PATENT DOCUMENTS 4,987,185  1/1991  Aoki et al. .................... 525/66

FOREIGN PATENT DOCUMENTS 0 068 132 A2  1/1983  European Pat. Off. .
0 202 214 A2  11/1986  European Pat. Off. .

*Primary Examiner*—Ana Woodward
*Attorney, Agent, or Firm*—Cushman Darby & Cushman IP Group of Pillsbury Madison & Sutro LLP

[57] ABSTRACT

The invention relates to a polymer composition comprising 5 to 79 wt. % of a graft copolymer of vinyl aromatic monomer units and monomer units chosen from the group of $C_1$–$C_4$ alkyl methacrylates, $C_1$–$C_4$ alkyl acrylates, methacrylonitrile and acrylonitrile on a rubber, 90 to 20 wt. % of a thermoplastic polymer with polar groups, and 1 to 50 wt. % of a terpolymer comprising a vinyl aromatic monomer, at least one monomer chosen from the group of $C_1$–$C_4$ alkyl methacrylates, $C_1$–$C_4$ alkyl acrylates, methacrylonitrile and acrylonitrile, and 0.2 to 5 mol % of an α,β-unsaturated compound containing dicarboxylic anhydride, the wt. % of components (A), (B) and (C) being relative to the total weight of components (A), (B) and (C), characterized in that the molar mass of component (C) is comprised between 160,000 g/mol and 230,000 g/mol. The polymer composition has excellent mechanical properties, in particular a high impact resistance at low temperatures.

26 Claims, No Drawings

RUBBER-MODIFIED POLYMER COMPOSITION

BACKGROUND OF THE INVENTION

1. Field of the Invention

The invention relates to a polymer composition comprising (A) a graft copolymer of vinyl aromatic and vinyl cyanide monomer units grafted on a rubber, (B) a thermoplastic polymer with polar groups and (C) a polymer comprising a vinyl aromatic monomer, acrylonitrile and a compound containing $\alpha,\beta$-unsaturated dicarboxylic anhydride.

2. Description of the Related Art

Such a polymer composition is known from EP-B-202, 214. EP-B-202,214 describes a polymer composition of a polyamide, an acrylonitrile-butadiene-styrene graft copolymer (ABS) and a terpolymer obtained by polymerization of styrene, acrylonitrile and maleic anhydride (MA). ABS-type polyamide polymers and graft copolymers are not miscible and consequently form two separate phases when mixed. The poor miscibility results in a polymer composition having relatively poor mechanical properties. The terpolymer described above acts as compatibility-enhancing agent between the polyamide and the ABS polymer and its application in the composition results in higher impact resistance.

The drawback of the known polymer composition is that its impact resistance is highly temperature dependent. Thus the impact resistance at low temperatures, for instance at $-20°$ C. (the 'cold impact resistance'), is low. This is a serious drawback for instance where application of the known polymer composition in molded parts is concerned, for instance in the automotive industry. A high cold impact resistance is required for instance for polymer compositions used in bumpers.

SUMMARY OF THE INVENTION

The object of the invention is to provide a polymer composition which does not have the said drawback.

The polymer composition according to the invention is characterized in that the molar mass of the polymer (C) is between 160,000 g/mol and 230,000 g/mol.

In the context of the present application, molar mass is understood to mean the weight average molecular weight.

In EP-B-202,214, page 4, lines 14–16, it is said that the molar mass of the known compatibility enhancing terpolymer can vary from 40,000 g/mol to less than 200,000 g/mol, but that the molar mass preferably is lower than 100,000 g/mol. Terpolymers with a molar mass higher than 100,000 g/mol are not readily mixed in the polymers to be compatibilized, do not easily reach the interface between the polymers—split up into phases—and consequently their compatibilizing effect is eliminated or affected.

In view of the foregoing it is surprising that the application of the polymer (C) of the present invention in a polymer composition comprising an ABS and a polymer of, for instance, the polyamide type, gives the polymer composition a particularly high cold impact resistance.

EP-A-402,528 also describes a polymer composition of a polyamide, an acrylonitrile-butadiene-styrene graft copolymer (ABS) and a terpolymer obtained by polymerization of styrene, acrylonitrile and maleic anhydride. In order to obtain the required high impact resistance at temperatures lower than $0°$ C. a specific type of ABS is used, the polybutadiene rubber having an average particle size between 0.2 and 1.0 µm, a grafting degree of 40 to 80% and a molar mass of 220,000 to 450,000 g/mol. When the current types of ABS are used in the polymer composition a high cold impact resistance is not achieved. Moreover a polymer composition as described in EP-A-402,528 exhibits a limited flow.

A further advantage of the polymer composition according to the invention is its excellent flow. By this is meant that, contrary to what would be expected on the basis of the relatively high molar mass of the terpolymer, the flow of the polymer composition as measured by the Melt Flow Index (MFI) does not differ significantly from the MFI of the known polymer composition. A good flow is very important in the manufacture of large molded parts by means of processes such as injection moulding.

By preference, the polymer composition according to the invention is characterized in that the molar mass of the polymer (C) is between 190,000 g/mol and 215,000 g/mol. This gives an additionally enhanced cold impact resistance.

DETAILED DESCRIPTION OF THE INVENTION

The graft copolymer (A) in the polymer composition according to the invention comprises a graft copolymer of a vinyl aromatic compound, a vinyl cyanide and optionally a third monomer on a rubber. Suitable vinyl aromatic compounds are chosen for instance from the group comprising styrene, $\alpha$-methyl-styrene, o-vinyl toluene, m-vinyl toluene and/or p-vinyl toluene, vinyl naphthalene, dimethyl styrene, t-butyl styrene and halogenated styrene derivatives, such as for instance chlorostyrene or bromostyrene. The vinyl aromatic compound preferably is styrene and/or $\alpha$-methyl styrene. Suitable vinyl cyanide compounds are for instance chosen from the group comprising acrylonitrile and cyanoalkylene compounds containing 4–7 carbon atoms, such as methacrylonitrile. Preferably the vinyl cyanide compound is acrylonitrile and/or methacrylonitrile. Suitable third monomers are chosen for instance from the group comprising acrylates and methacrylates, such as methyl methacrylate and ethyl acrylate, and substituted or non-substituted imide derivatives of $\alpha,\beta$-unsaturated dicarboxylic acids and $\alpha,\beta$-unsaturated dicarboxylic anhydrides, such as maleimide and N-phenyl maleimide.

The rubber for the graft copolymer can be chosen from known rubbers. In general the glass transition temperature of these rubbers is lower than $-10°$ C. Suitable rubbers are for instance chosen from the group comprising butadiene rubbers and ethene-propene copolymers, optionally comprising units of a third copolymerizable diene monomer, such as 1,4-hexadiene, dicyclopentadiene, dicyclooctadiene, methylene norbornene, ethylidene norbornene and tetrahydroindene. Optionally, the graft copolymer also contains a minor amount of natural rubber and/or an elastomer which mainly consists of 1,3 diene compounds such as butadiene-1,3, isoprene and 2,3-dimethyl butadiene-1,3. Preference is given to polybutadiene homopolymers or to butadiene copolymers having a butadiene content of 60–90 wt. %. Particularly suitable graft copolymers in the polymer composition according to the invention are acrylonitrile-styrene-butadiene (ABS), acrylonitrile-styrene-acrylate (ASA) and an ethene-propene-diene rubber polymerized with styrene and acrylonitrile (AES). Most preferably an acrylonitrile-butadiene-styrene (ABS) graft copolymer is used in the composition according to the invention.

The amount of rubber in the graft copolymer is preferably 20–70 wt. %, more preferably 35–65 wt. %. Most preferably the percentage of rubber is 40–50 wt. %. The average particle size of the polybutadiene rubber can be chosen between wide limits. The average particle size preferably is between 0.1 and 0.5 µm. It is possible to use rubber particles having a bimodal particle size distribution, i.e. a particle size distribution in which the particle sizes are grouped around two different averages.

The graft copolymer can be synthetized by means of generally known processes. Examples of such processes are methods such as mass polymerization, emulsion polymerization, suspension polymerization and mass suspension polymerization. By preference, emulsion polymerization is applied. Further, the polymerization preferably is carried out in such a way that a grafting efficiency (the monomer fraction that is grafted onto the rubber) of at least 20 wt. % is achieved. More preferably, the grafting efficiency is at least 40 wt. %. The way in which this can be achieved is known to the person skilled in the art.

Customary auxiliary agents can be used in the polymerization process. Examples of such auxiliary agents are chain controllers, emulsifiers and compounds yielding free radicals. The molar mass of the graft copolymer can be chosen between wide limits. Molar masses between 80,000 g/mol and 200,000 g/mol for instance can be used for the polymer composition. The molar mass of the graft copolymer is preferably chosen higher than 80,000 g/mol, because otherwise the mechanical properties of the polymer composition deteriorate. Further it is advantageous to carry out the polymerization in such a way that the molar mass of the graft copolymer is lower than 200,000 g/mol, more preferably lower than 170,000 g/mol. Most preferably the molar mass of the graft copolymer is at most 130,000 g/mol. This results in an improvement of the flow of the polymer composition according to the invention without any significant decline of the high cold impact resistance.

Optionally, a separately obtained copolymer of vinyl aromatic and vinyl cyanide monomer units, preferably styrene and acrylonitrile, can be added to the graft copolymer.

The thermoplastic polymers with polar groups (B) that can be used in the polymer composition according to the invention are generally known polymers, such as polycarbonates, polyacetals, vinyl aromatic polymers, vinyl chloride polymers, polyamides, polyesters or mixtures of these polymers. The thermoplastic polymer with polar groups preferably is a polyamide.

Polyamides are understood to include conventional polyamide resins which are known under the name 'nylon', including the aliphatic polylactams. Polyamides are obtained by polycondensation of aliphatic, alicyclic and aromatic diamines and dicarboxylic acids, or by ring opening polymerization. Suitable polyamides are for instance nylon 6 (polycaprolactam), nylon 11, nylon 12 (polylauryllactam), nylon 4,6 (polytetramethylene adipamide), nylon 6,6 (polyhexamethylene adipamide), nylon 6,10 (polyhexamethylene sebacamide), nylon 6,9 (polyhexamethylene azelamide), and random copolymers of nylon 6 and 6,6, nylon 6,6 and 6,10 and nylon 6 and 11. The polyamide preferably is a nylon 6, nylon 6,6 and/or a random copolymer of nylon 6,6 and nylon 6. The molar mass of the polyamide preferably amounts to a minimum of 20,000 g/mol.

Other suitable polyamides for the polymer composition according to the invention are star-branched polyamides, to be obtained for instance by ring-opening polymerization of a lactam with a multifunctional core molecule, as described for instance by J. M. Waratomski, Chem. Mater. 4, 1000–04, (1992). These star-branched polyamides are particularly suitable because they exhibit an excellent balance between properties and flow.

In the framework of the present application, polymers are deemed to be miscible if they form a composition consisting of a single phase. If polymers are only partially miscible or not at all, they will form separate phases in a composition. The specific morphology that results depends on the relative quantities and the nature of the polymers combined in the composition. If an excess of one polymer is applied, then that particular polymer will in general form a continuous phase in which the other polymer is dispersed. If about equal quantities of the polymers are applied, a morphology with a co-continuous structure can result.

Polymers are deemed to be compatible if they form a stable multi-phase composition having practically useful and synergistic mechanical properties, for the composition according to the invention in particular a high impact strength and/or elongation at break. Incompatible polymers by contrast form a multi-phase composition with inferior properties compared with the polymers individually.

Polyamides in general are neither miscible, nor compatible with hydrocarbon resins such as polystyrene or acrylonitrile-butadiene-styrene graft copolymers.

A compatible composition of polyamide and graft copolymers of the ABS type is obtained through application of terpolymer (C), which acts as a compatibilizing agent. The polymer (C) in the composition according to the invention typically comprises (C1) a vinyl aromatic monomer, (C2) at least one monomer chosen from the group of $C_1$–$C_4$ alkyl methacrylates, $C_1$–$C_4$ alkyl acrylates, methacrylonitrile and acrylonitrile, and (C3) an α, β-unsaturated compound containing dicarboxylic anhydride.

By preference the polymer composition according to the invention is characterized in that component (C) of the polymer composition is a terpolymer of styrene, acrylonitrile and maleic anhydride. This terpolymer considerably improves the cold impact resistance of the polymer compositions mentioned in the introduction hereof. The amount of maleic anhydride in the terpolymer can be chosen within a wide range. However, there are advantages in characterizing the polymer composition according to the invention in that the amount of maleic anhydride in component (C) of the polymer composition is between 0.2 and 5 mol %. Most preferably the amount of maleic anhydride in component (C) of the polymer composition is between 0.5 and 1.5 mol %. This gives a good balance between the impact resistance and cold impact resistance, on the one hand, and the processability of the polymer composition, on the other.

The terpolymer can be prepared in a usual manner. A suitable method is to dissolve in a suitable solvent, for instance methyl ethyl ketone (MEK), the component monomers of the terpolymer, for instance styrene, maleic anhydride and acrylonitrile. One or, optionally, more chemical initiators are added to this solution. Suitable initiators are for instance peroxides. Then the mixture is polymerized for a number of hours at an elevated temperature, after which the solvent and non-converted monomers are removed in a known way. The molar mass of the terpolymer can be set in a way known to the person skilled in the art, for instance by setting the reaction temperature or by choosing a particular type and quantity of chemical initiator.

The ratio between the vinylaromatic monomer and the acrylonitrile monomer in the terpolymer according to the invention is preferably between 80:20 and 50:50. In order to improve the miscibility of the terpolymer with the graft copolymer (A), the relative quantity of styrene monomer in the terpolymer is preferably chosen virtually equal to the relative quantity of styrene monomer in the graft copolymer (A).

The relative quantity of terpolymer in the composition according to the invention is between 1 and 50 wt. %, preferably between 1 and 15 wt. %, more preferably between 3 and 10 wt. %. Most preferably, the relative quantity of terpolymer in the composition according to the invention is between 5 and 7 wt. %.

The polymer composition according to the invention can be prepared thermoplastically in a known way and then be processed to a molded part. Suitable preparation equipment is for instance a single-screw or twin-screw extruder. For the processing to a molded part an injection molded machine can be used. The composition can also be compression molded to an end product. Due to the excellent processability of the composition according to the invention it is highly suitable for the manufacture of a wide variety of objects. Because of the excellent flow behavior of the polymer composition according to the invention it is in particular suitable for injection moulding of large molded parts, which in general involves long flow paths. Examples of large molded parts are bumpers, mudguards, front fascias, dashboards, interior door panels and center consoles of motorcars.

If desired, additives can be added to the polymer composition according to the invention. Examples of customary additives are stabilizers, antioxidants, lubricants, fillers, colorants, pigments, flame retarding agents, conductive fibers and reinforcing fibers such as glass fibers and carbon fibers. The additives can optionally be added before or during the processing step.

The invention will now be elucidated by means of the following non-restrictive examples.

EXAMPLES AND COMPARATIVE EXPERIMENTS

Components used

ABS—obtained by grafting styrene and acrylonitrile onto polybutadiene rubber by means of emulsion polymerization. The styrene:acrylonitrile weight ratio is 70:30. The rubber content is 40 wt. %. This ABS is available from DSM in the Netherlands under the tradename Ronfalin™ TZ220.

PA—a polyamide 6 available from DSM in the Netherlands under the tradename Akulon™ K123.

COM—a terpolymer of styrene, acrylonitrile and maleic anhydride (MA). This terpolymer is obtained by dissolving in methyl ethyl ketone (MEK) styrene and acrylonitrile in a ratio of 2.2:1 and a variable amount of MA. The resulting mixture is polymerized at an elevated temperature, after which the solvent is evaporated. The molar mass of the terpolymer was determined by means of the GPC method described below. The mole percentage of MA in the terpolymer was calculated from the polymerization conversion and the amount of MA added to the solution. The terpolymers obtained are described in the following table.

| COM terpolymer | Mol % MA | Molar mass (g/mol) |
| --- | --- | --- |
| COM-1 | 0.9 | 204000 |
| COM-2 | 0.7 | 116000 |
| COM-3 | 1.1 | 100000 |
| COM-4 | 0.5 | 100000 |
| COM-5 | 0.8 | 50000 |

Polymer compositions were prepared from the above compositions, in the following way. The components (ABS, PA and COM) were supplied to a Schwabenthan™ single-screw extruder running at 60 rpm. The temperature setting along the length of the extruder was 50/150/190/230/245/245/245° C. The melting temperature was about 270° C. Only the polyamide was pre-dried. The granulate obtained was pre-dried under vacuum at 80° C. for 16 hours. Then the granulate was injection molded to test bars on a standard Arburg™ injection molding machine, the temperature of the melt being about 260° C. The mold temperature was 70° C. The composition of the polymers prepared was as follows.

| Example | ABS | PA | COM-1 | COM-2 | COM-3 | COM-4 | COM-5 |
| --- | --- | --- | --- | --- | --- | --- | --- |
| 1 | 54.8 | 39.2 | 6.0 | — | — | — | — |
| A | 56.8 | 39.2 | — | 4.0 | — | — | — |
| B | 54.8 | 39.2 | — | — | 6.0 | — | — |
| C | 54.8 | 39.2 | — | — | — | 6.0 | — |
| D | 54.8 | 39.2 | — | — | — | — | 6.0 |
| E | 54.8 | 39.2 | — | 6.0 | — | — | — |
| F | 52.8 | 39.2 | — | 8.0 | — | — | — |

Testing and characterization methods used

The molar mass was determined by means of gel permeation chromatography (GPC). A Hewlett Packard™ HP1090 chromatograph, coupled to a differential viscosimeter (Viscotek™ model 200).

The experimental conditions were as follows:

| | |
| --- | --- |
| Solvent/eluent: | tetrahydrofuran with 5 wt-% acetic acid added. |
| Initial concentration of polymer: | 0.2 wt.-%. |
| Dissolution time/temperature: | 2 hours at room temperature. |
| Column configuration: | 5 columns in series with ultra Styragel ™ (from Waters) with a nominal exclusion limits of 50, 100, 1000, 10000 and 10 nm, respectively. |
| Detectors: | refractometer, ultraviolet dioide array and differential viscosimeter. |
| Calibration: | Polystyrene standards (from Polymer Laboratories) with molar masses of 0.58 to 2880 kg/mol. |

The procedure applied further was as described in ASTM Method D 3536-91.

The Izod notched impact resistance was measured according to ASTM D—256 at temperatures of −20° C., −10° C. and 23° C. The test bar thickness was 6.4 mm.

The flexural modulus and strength were measured according to ASTM D-790 at 23° C.

The instrumented falling dart impact test was carried out at 23° C. and −20° C. on square clamped test plates with a thickness of 3.2 mm. A dart with a hemispherical head and a diameter of 10 mm was used. The velocity of fall was 4.4 m/s. The fracturing behavior (with or without splintering) and the total absorbed energy at −20° C. and 23° C. were determined.

The Melt Flow Index (MFI) measured according to ASTM D 1238 was determined as a measure of the flow.

The temperature resistance of the samples was measured by means of the Vicat 850 method according to ASTM D 1525.

The test results obtained are shown in table 1.

The total dissipated energy in the falling dart impact test at 23° C. in Example 1 and Comparative Experiments A–F amounted to 44.3 J/42.8 J/44.2 J/45.0 J/44.2 J/44.6 J and 44.6 J, respectively. The flexural modulus at 23° C. amounted to 1865 MPa/1760 MPa/1750 MPa/1700 MPa/ 1750 MPa/ 1800 MPa and 1850 MPa, respectively. The Vicat value was 106.20° C./106.0° C./106.7° C./107.0° C./107.0° C./106.2° C. and 107.0° C., respectively.

TABLE 1

| | test results | | | |
|---|---|---|---|---|
| Exp. No. | Izod 23° C. (kJ/m$^2$) | Izod −10° C. (kJ/m$^2$) | Izod −20° C. (kJ/m$^2$) | MFI (dg/10 min) |
| 1 | 79.2 | 61.5 | 50.4 | 4.7 |
| A | 82.6 | — | 19.5 | 5.2 |
| B | 80.7 | — | 28.5 | 5.1 |
| C | 82.2 | — | 18.3 | 6.5 |
| D | 84.5 | 30.1 | 22.8 | 7.2 |
| E | 82.1 | 63.0 | 26.1 | 5.7 |
| F | 79.9 | — | 29.6 | 5.9 |

We claim:

1. A polymer composition comprising the following components:
   (A) 5 to 79% by weight of a graft copolymer comprising vinyl aromatic units and vinyl cyanide units, said vinyl aromatic units and vinyl cyanide units both being grafted on a rubber;
   (B) 90 to 20% by weight of a thermoplastic polymer with polar groups; and
   (C) 1 to 50% by weight of a terpolymer formed from a composition comprising:
      (C1) a vinyl aromatic monomer;
      (C2) at least one monomer selected from the group consisting of C$_1$–C$_4$ alkyl methacrylates, C$_1$–C$_4$ alkyl acrylates, methacrylonitrile, and acrylonitrile; and
      (C3) 0.2 to 5 by mole of a compound containing α, β-unsaturated dicarboxylic anhydride,
   wherein the weight percentages of said components (A), (B), and (C) are based on the total weight of said components (A), (B), and (C), and
   wherein said component (C) has a molar mass between 160,000 g/mol and 230,000 g/mol.

2. A polymer composition according to claim 1, wherein said vinyl cyanide aromatic units include at least one member selected from the group consisting of methacrylonitrile and acrylonitrile.

3. A polymer composition according to claim 2, wherein said component (A) further comprises monomer units selected from the group consisting of C$_1$–C$_4$ alkyl methacrylates and C$_1$–C$_4$ alkyl acrylates grafted on said rubber.

4. A polymer composition according to claim 3, wherein said component (B) is a polyamide polymer.

5. A polymer composition according to claim 3, wherein said component (B) is a nylon 6 polymer.

6. A polymer composition according to claim 3, wherein said component (B) has a molar mass of at least 20,000 g/mol.

7. A polymer composition according to claim 3, wherein said component (A) is an acrylonitrile-butadiene-styrene graft copolymer.

8. A polymer composition according to claim 3, wherein said component (A) has a molar mass not greater than 130,000 g/mol.

9. A polymer composition according to claim 3, wherein said component (C) is present in a concentration of between 1 and 15% by weight based on the total weight of said components (A), (B), and (C).

10. A polymer composition according to claim 9, wherein said component (C) constitutes between 3 and 10% by weight of the total weight of said components (A), (B), and (C).

11. A polymer composition according to claim 3, wherein said sub-components (C1), (C2), and (C3) of said component (C) are styrene, acrylonitrile, and maleic anhydride, respectively.

12. A polymer composition according to claim 11, wherein said maleic anhydride is present in said component (C) in a concentration of between 0.5 and 1.5% by mole.

13. A polymer composition comprising the following components:
   (A) 5 to 79% by weight of a graft copolymer comprising vinyl aromatic units and vinyl cyanide units, said vinyl aromatic units and vinyl cyanide units both being grafted on a rubber;
   (B) 90 to 20% by weight of a thermoplastic polymer with polar groups; and
   (C) 1 to 50% by weight of a terpolymer formed from a composition comprising:
      (C1) a vinyl aromatic monomer;
      (C2) at least one monomer selected from the group consisting of C$_1$–C$_4$ alkyl methacrylates, C$_1$–C$_4$ alkyl acrylates, methacrylonitrile, and acrylonitrile; and
      (C3) 0.2 to 5 by mole of a compound containing α, β-unsaturated dicarboxylic anhydride,
   wherein the weight percentages of said components (A), (B), and (C) are based on the total weight of said components (A), (B), and (C), and
   wherein said component (C) has a molar mass between 190,000 g/mol and 215,000 g/mol.

14. A polymer composition according to claim 13, wherein said vinyl cyanide units include at least one member selected from the group consisting of methacrylonitrile and acrylonitrile.

15. A polymer composition according to claim 14, wherein said component (A) further comprises monomer units selected from the group consisting of C$_1$–C$_4$ alkyl methacrylates and C$_1$–C$_4$ alkyl acrylates grafted on said rubber.

16. A polymer composition according to claim 15, wherein said component (B) is a polyamide polymer.

17. A polymer composition according to claim 15, wherein said component (B) is a nylon 6 polymer.

18. A polymer composition according to claim 15, wherein said component (B) has a molar mass of at least 20,000 g/mol.

19. A polymer composition according to claim 15, wherein said component (A) is an acrylonitrile-butadiene-styrene graft copolymer.

20. A polymer composition according to claim 15, wherein said component (A) has a molar mass not greater than 130,000 g/mol.

21. A polymer composition according to claim 15, wherein said component (C) is present in a concentration of between 1 and 15% by weight based on the total weight of said components (A), (B), and (C).

22. A polymer composition according to claim 21, wherein said component (C) constitutes between 3 and 10% by weight of the total weight of said components (A), (B), and (C).

23. A polymer composition according to claim 15, wherein said sub-components (C1), (C2), and (C3) of said component (C) are styrene, acrylonitrile, and maleic anhydride, respectively.

24. A polymer composition according to claim 23, wherein said maleic anhydride is present in said component (C) in a concentration of between 0.5 and 1.5% by mole.

25. A molded article, at least a portion of which is formed from the polymer composition of claim 1.

26. A molded article, at least a portion of which is formed from the polymer composition of claim 13.

* * * * *